United States Patent [19]

Heinle

[11] Patent Number: 5,001,411

[45] Date of Patent: Mar. 19, 1991

[54] METHOD FOR SIMULATING THE ACTUAL LOAD ANGLE OF A POLYPHASE MACHINE AND CIRCUIT ARRANGEMENT FOR CARRYING OUT THE METHOD

[75] Inventor: Georg Heinle, Erlangen, Fed. Rep. of Germany

[73] Assignee: Siemens Aktiengesellschaft, Berlin & Munich, Fed. Rep. of Germany

[21] Appl. No.: 275,328

[22] Filed: Nov. 22, 1988

[30] Foreign Application Priority Data

Nov. 25, 1987 [DE] Fed. Rep. of Germany ....... 3739971

[51] Int. Cl.$^5$ .............................................. H02P 5/40
[52] U.S. Cl. .................................... 318/805; 318/800
[58] Field of Search ........ 318/800, 803, 805, 807–811; 324/158 MG

[56] References Cited

U.S. PATENT DOCUMENTS 4,757,248 7/1988 Fujibka et al. ...................... 318/800

Primary Examiner—David Smith, Jr.
Attorney, Agent, or Firm—Kenyon & Kenyon

[57] ABSTRACT

The invention relates to a method for simulating the actual load angle value ($v$) of polyphase machine from the terminal voltages ($u_R$, $u_S$) and conductor currents $i_R$, $i_S$) of at least two phases (R, Š) of the stator of a polyphase machine, each of which represents stator-oriented a–c variables, where said stator-oriented a–c variables ($u_R$, $u_S$, $i_R$, $i_S$) are transformed into a first stator current component ($i_1$) and a second stator current component ($i_2$) of the machine current vector ($i^s$) and an absolute value of the machine flux vector ($|\phi^s|$), each of which are field-oriented d–c variables. According to the invention, a first corrected stator current component ($i_1$) consisting of a stationary component ($i_{1s}$) and a dynamic component ($i_{1d}$) is generated where the stationary component ($i_{1s}$) is determined form the absolute value of the machine flux vector ($|\phi^s|$) divided by the value of the main machine inductance ($1_H$) and the dynamic component ($i_{1d}$) is equal to the high-frequency share of the first stator component ($i_1$) and the actual load anglevalue ($v$) is derived form the relation $v = \tan^{-1} i_2/i_1$. Thus, the actual load angle value ($v$) can be simulated over the entire control ragne of the polyphase machine without error.

3 Claims, 2 Drawing Sheets

METHOD FOR SIMULATING THE ACTUAL LOAD ANGLE OF A POLYPHASE MACHINE AND CIRCUIT ARRANGEMENT FOR CARRYING OUT THE METHOD

BACKGROUND OF THE INVENTION

1. Field of Invention

The invention relates to a method for simulating the load angle of a polyphase machine from the terminal voltages and line currents of at least two phases of the stator of a polyphase machine which represent the respective stator-oriented a-c variables. The stator-oriented a-c variables are transformed into a first stator current component and a second stator current component of the machine current vector and an amplitude of the machine flux vector which are respective field-oriented d-c variables, wherein the first stator current component lies in the direction of the machine flux vector and the second stator current component is perpendicular to the machine flux vector.

2. Description of the Prior Art

Field-oriented controllers for polyphase machines are commercially available whereby the converter-supplied polyphase machine with the field-oriented control has characteristics which are equivalent to those of a d-c drive statically as well as dynamically. Such a drive, controlled with respect to speed or torque, makes possible a four-quadrant operation, where the machine can be set continuously to the rated torque even at standstill.

The principle of field orientation is based on the fact that the variable terminal voltage and conductor current of at least two phases of the stator of a polyphase machine, measured as a-c variables (stator-oriented variables), are transformed by a field-oriented coorindate transformation into d-c variables in such a manner that a separate control of the magnetizing current ($i_1$ - control) and the active current ($i_2$ - control) is possible. A flux control can be superimposed on the $i_1$ - control and a speed control on the $i_2$ - control. The generated field-oriented control variables are transformed by a stator-oriented coordinate transformation into stator-oriented control variables and are fed to the converter as control voltages.

From DE-AS No. 28 33 593, a method for simulating the machine flux of a polyphase machine from the terminal voltages and conductor currents of at least two phases of the stator of the polyphase machine is known. As a circuit arrangement for carrying out this method, a computing circuit is provided which simulates the machine flux from the terminal voltages and the conductor currents of two phases of the polyphase machine. This computing circuit is called a voltage model of the polyphase machine.

Furthermore an actual-value computer is known which generates from the terminal voltages and the conductor currents of at least two phases of the stator of the polyphase machine, field-oriented d-c variables, for instance, a first and second stator current component and the amplitude of the machine flux vector. The first stator current component lies here in the direction of a machine flux vector and the second stator current component is perpendicular to the machine flux vector.

For simulating the actual load angle, a quotient is to be formed from the second and first stator current component generated by means of the actual-value computer, from which the arc tangent is calculated. The machine flux vector which is simulated from the terminal variables of the polyphase machine by means of the actual-value computer on which the voltage model is based has an inherent error, the error being noticeable especially in the phase angle of the machine flux vector. Since the first stator current component lies in the direction of the machine flux vector, this error has a full effect on the first stator current component. Thus, the simulation of the actual load angle value has an inherent error.

OBJECTIVES AND SUMMARY OF THE INVENTION

It is an object of the invention to provide method, for simulating the actual load angle value of a polyphase machine in such a manner that the first stator current component having an error of the actual-value computer is corrected, whereby the calculation of the actual load angle value becomes substantially free of errors, and to describe a circuit arrangement for carrying out the method according to the invention.

According to the invention, this problem is solved by the provision that a corrected first stator current component consisting of a stationary component and a dynamic component is generated, wherein the stationary component is determined from the absolute value of the machine flux vector divided by the value of the main machine inductance and the dynamic component is equal to the high-frequency motion of the first stator current components, and that the actual load angle value is derived from the relation $$\nu = \tan^{-1} i_2/\overline{i_1}$$

wherein $i_2$ = second stator current component; and $\overline{i_1}$ = the corrected first stator current component.

Due to the fact that the corrected first stator current component consists of two components, namely, a stationary and a dynamic component, a very good simulation of the actual load angle value is obtained over the entire control range of the polyphase machine. The stationary component of the corrected first stator current component is determined from the absolute value of the machine flux vector divided by the value of the main machine inductance. Both parts of this quotient are determined approximately without error so that the actual load angle value can be simulated without error for the stationary case. In the dynamic case, the dynamic component which is equal to the high-frequency portion of the first stator current component having an error, is noticeable, whereby the actual load angle value can be determined without error also if the load of the polyphase machine changes.

In an advantageous circuit arrangement for carrying out the with an actual-value computer which transforms the stator oriented a-c variables into field-oriented d-c variables, the first stator current component is fed via a highpass filter, the time constant of which is approximately equal to the machine flux time constant of the rotating-field machine, to a first input of a summing stage, the second input of which is linked to an output of a quotient generator. The first input of which is acted upon by the absolute value of the machine flux vector and the second input of which is acted upon by the value of the main machine inductance, the output of the summing stage is linked to a second input of a processing circuit. The first input of the processing circuit is acted upon by the second stator current component, where the processing circuit contains a quotient generator followed by a memory.

With this circuit arrangement, the actual load angle value can be simulated substantially free of error over the entire speed range of the polyphase machine independently of the load. By the composition of the corrected first field oriented stator current component according to the invention, the actual load angle value is simulated approximately free of error for the stationary and dynamic operating state of the polyphase machine.

In a particularly simple circuit arrangement, a processor is provided as the processing circuit. Thereby, the actual load angle can be calculated particularly simply and fast from the second field-oriented stator current component and the corrected first field-oriented stator current component.

BRIEF DESCRIPTION OF THE INVENTION

For a further explanation of the invention, reference is made to the drawing in which an embodiment of the invention is illustrated schematically, wherein.

DETAILED DESCRIPTION OF THE INVENTION

Figure 1:
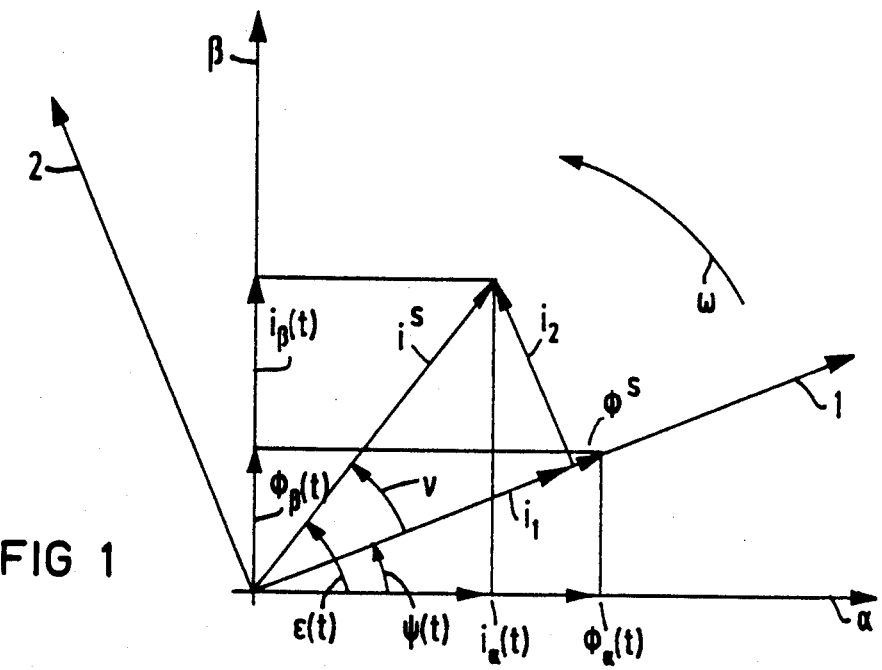
FIG. 1 shows a space vector diagram.

FIG. 1 shows a space vector diagram, in which the axes of the orthogonal stator coordinate system are designated with $\alpha$ and $\beta$ and the axes of the orthogonal field coordinate system with the numerals 1 and 2. From two phase currents $i_R$ and $i_S$ of a three-phase system of the stator of the polyphase machine, a two-phase system with two orthogonal currents $i_\alpha$ and $i_\beta$ is formed. The axes of the two-phase system, also called an orthogonal stator coordinate system, are placed so that one axis coincides with the direction of the phase current $i_R$. Thereby, the value of the $\alpha$-current component $i_\alpha$ is equal to the value of the phase current $i_R$ and the value of the $\beta$-current component $i_\beta$ is derived from the relation $2/\sqrt{3}$ ($\frac{1}{2}$ $i_R + i_S$). From these two orthogonal current components $i_\alpha$ and $i_\beta$, a stator current vector $i^s$ is formed which encloses in the stator coordinate system $\alpha/\beta$ an angle $\epsilon(t)$ with the $\alpha$-axis. This stator current vector $i^s$ rotates with the angular velocity $\omega$ of the magnetic stator field, while $i_\alpha$ and $i_\beta$ oscillate with the corresponding frequency. The angle $\epsilon(t)$ which the vector $i^s$ encloses with the $\alpha$-axis at a given point in time, changes with the angular velocity $\omega$ of the rotating current vector $i^s$. In addition, a space vector diagram of the machine flux vector $\phi^s$ is shown which encloses whith the $\alpha$-axis an angle $\psi(t)$. Their difference $\epsilon(t) - \psi(t) = \nu$, is constant in time unless the load conditions of the machine change. The components $\phi_\alpha$ and $\phi_\beta$ of the machine flux vector $\phi^s$ are determined by an actual-value computer 3 according to FIG. 2, on which the so-called voltage model is based, from the stator-oriented a-c variables (terminal voltage $u_R$, terminal voltage $u_S$, conductor current $i_R$ and conductor current $i_S$). The absolute value of the machine flux vector $|\phi^s|$ is here approximately free of errors, but the angle $\psi(t)$ has errors. By the position of the machine flux vector $\phi^s$, a field coordinate system with the axes 1 and 2 is fixed, where the machine flux vector $\phi^s$ lies in the direction of the axis 1. The stator current vector $i^s$ is composed in the field coordinate system 1, 2 of a first stator current component $i_1$ and a second stator current component $i_2$, each of which are d-c variables. The first field-oriented stator current component $i_1$ lies in the direction of the machine flux vector $\phi^s$ and the second field-oriented stator current component $i_2$ is perpendicular to the machine flux vector $\phi^s$. Since the angle $\psi(t)$ of the machine flux vector $\phi^s$ has errors, this error propagates in the first stator current component $i_1$ at heavy load of the polyphase machine, especially at the rated torque. This transformation of the stator-oriented a-c variables $\phi_\alpha$, $\phi_\beta$, $i_\alpha$ and $i_\beta$ into field-oriented d-c variables and $i_2$ is made possible by a vector rotator which, according to FIG. 2, is a block diagram of the actual-value computer 3.

Figure 2:
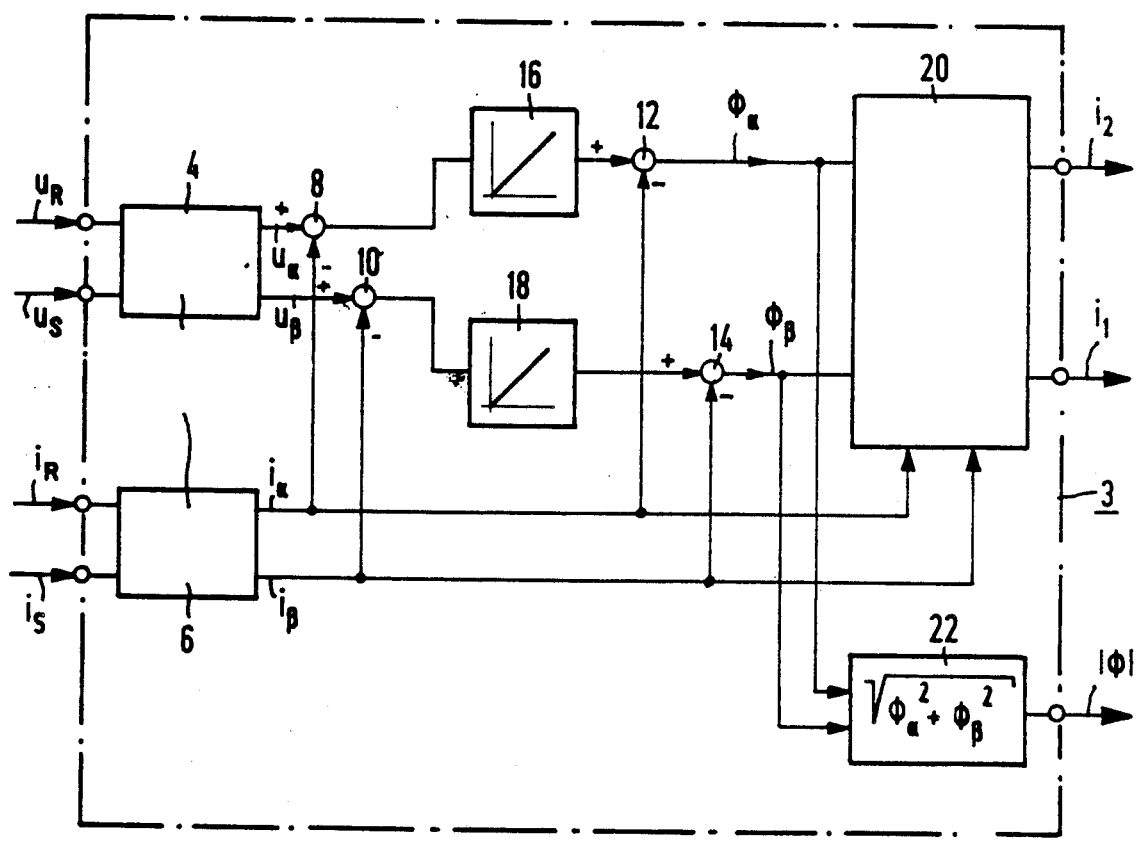
FIG. 2 shows a prior art actual-value computer which transforms stator-oriented a-c variables into field-oriented d-c variables.

FIG. 2 illustrates a known actual-value computer 3 which transforms the stator-oriented a-c variables $u_R$, $u_S$, $i_R$ and $i_S$ into field-oriented d-c variables $i_1$, $i_2$ and $|\phi^s|$. This actual-value computer 3 contains two coordinate transformers 4 and 6, four summing stages 8, 10, 12 and 14, two integrators 16 and 18, a vector rotator 20 and an absolute-value generator 22.

The coordinate transformer 4 and 6, respectively, transforms the terminal voltage $u_R$ and $u_S$ and the conductor currents $i_R$ and $i_S$ of a three-phase system into a two-phase system with two orthogonal voltages $u_\alpha$ and $u_\beta$ and currents $i_\alpha$ and $i_\beta$ of the stator coordinate system $\alpha/\beta$. From these stator-oriented voltage components $u_\alpha$ and $u_\beta$ current-proportional ohmic voltage drops are subtracted, the respective difference being integrated by integrator 16, 18. At the output of the integrator 16 and 18, respectively, stator-oriented flux components $\phi_\alpha$ and $\phi_\beta$ are obtained, from which respective current-proportional inductive voltage drops are subtracted. These stator-oriented a-c variables $\phi_\alpha$, $\phi_\beta$, $i_\alpha$ and $i_\beta$ are transformed into field-oriented d-c variables $i_1$ and $i_2$ by means of the vector rotator 20. In addition, the absolute value of the machine flux vector $|\phi^s|$ is formed by means of the absolute-amount generator 22 from the stator-oriented flux component $\phi_\alpha$ and $\phi_\beta$.

Figure 3:
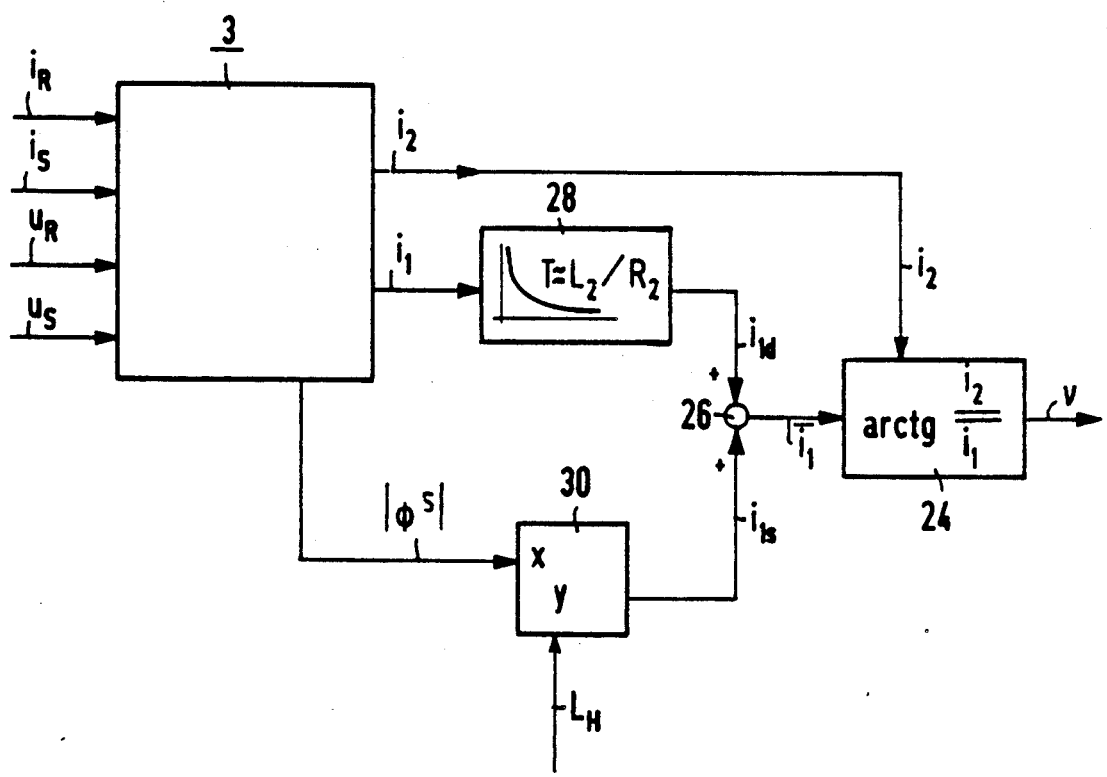
FIG. 3 shows arrangement for carrying out the method according to the invention.

In FIG. 3, a circuit arrangement for carrying out the method according to the invention is shown, wherein field-oriented d-c variables $i_1$, $i_2$ and $|\phi^s|$ are formed from stator-oriented a-c variables $u_R$, $u_S$, $i_R$ and $i_S$ by means of the actual-value computer 3. The second stator current component $i_2$ is fed directly to a first input of a processing circuit 24. One for calculating the arc tangent of $i_2/\overline{i}_1$. The design of such a processing circuit 24 is generally known. The processing circuit 24 can contain, for instance, a quotient generator followed by a memory means. In the memory, the arc tangent function, for instnace, is stored with a predetermined resolution. As the addresses of the memory, the respectively determined quotient of the second stator current vector $i_2$ and the corrected first stator current vector $\overline{i}_1$ are provided. A particularly simple embodiment of the processing circuit 24 is obtained if a processor is porvided as the processing circuit 24. To a second input of this processing circuit 24 is fed the corrected first stator current vector $\overline{i}_1$ which is present at the output of a summing stage 26. The first input of the summing stage 26 is connected to the actual value computer 3 via a highpass filter 28. The time constant T of this highpass 28 is approximately equal to the flux time constant $L_2/R_2$ of the polyphase machine. Thereby, only the high-frequency portion of the first stator current component with errors $i_1$ arrive at the first input of the summing stage 26. The second input of the summing stage 26 is connected to the output of a quotient generator 30, the first input x of which is acted upon by the absolute value of the machine flux vector $|\phi^s|$ and the second input y by the value of the main machine inductance $L_H$. At the output of this quotient former 30 is present a static current component $i_{1s}$, which is equivalent to the low-frequency portion of the field-oriented stator current component $i_1$. The corrected first stator current vector $\overline{i_1}$ which is present at the output of the summing stage 26 or at the second input of the processing circuit 24 thus contains a stationary and a dynamic component $i_{1s}$ and $i_{1d}$. In a stationary operating state of the drive, i.e., constant loading of a machine, the dynamic share $i_{1d}$ has hardly any effect. However, if the loading of the machine changes, i.e., in the dynamic operating state, the dynamic share can no longer be neglected. This part has been taken into consideration in the method according to the invention.

Thus, the actual load angle value $v$ which is present at the output of the processing circuit 24, and gives the angle between the stator current vector $i^s$ and the machine flux vector $\phi^s$ can be simulated, independently of the operating state of the polyphase machine by means of the circuit arrangement for carrying out the method according to the invention from the stator-oriented a-c variables $u_R$, $u_S$, $i_R$ and $i_S$ of two phases R and S of the stator of the polyphase machine.

What is claimed is:

1. Method for simulating the actual load angle value ($v$) of a polyphase machine from the terminal voltages and conductor currents of at least two phases of the stator of the polyphase machine which each represent stator-oriented a-c variables, where said stator-oriented a-c variables are transformed into a first stator current component and a second stator current component of the machine current vector and an absolute value of the machine flux vector, which each are field-oriented d-c variables, where the first stator current component lies in the direction of the machine flux vector and the second stator current component is perpendicular to the machine flux vector, comprising the steps of:

generating a corrected first stator current component consisting of a stationary component and a dynamic component, wherein the stationary component is determined from the absolute value of the machine flux vector divided by the value of the main machine inductance and the dynamic component is equal to the high-frequency share of the first stator current component and that the actual load angle value ($v$) is derived from the relation $$v = \tan^{-1} i_2/\overline{i_1}$$

wherein $i_2$ = the second stator current component and $\overline{i_1}$ = the corrected first stator current component.

2. A circuit arrangement for an actual-value computer that transforms stator-oriented a-c variables into field oriented d-c variables, said circuit arrangement comprising:

(a) a high-pass filter receiving a first stator current and having a time constant (T) approximately equal to a flux time constant of a polyphase machine;

(b) a summing stage having first and second inputs and an output, said first input being coupled to said high-pass filter;

(c) a quotient generator having first and second inputs and an output, said first input of said quotient generator being acted upon by an absolute value of a machine flux vector, said second input of said quotient generator being acted upon by a value of a main machine inductance, and said output of said quotient generator being coupled to said second input of said summing stage; and (d) a processing circuit having first and second inputs, said second input of said processing circuit being coupled to said output of said summing stage, said first input of said processing circuit being acted upon by a second stator current component, and wherein said processing circuit contains a second quotient generator and a memory coupled to the second quotient generator.

3. The circuit arrangement according to claim 2 wherein said processing circuit comprises a microprocessor.

* * * * *